Oct. 24, 1967 R. E. BUSCH 3,348,768
ACCUMULATION SELECTING MECHANISM FOR CALCULATING MACHINE
Filed Aug. 11, 1964 6 Sheets-Sheet 1

INVENTOR.
RICHARD E. BUSCH
BY Charles P. Miranda
ATTORNEY

Oct. 24, 1967  R. E. BUSCH  3,348,768
ACCUMULATION SELECTING MECHANISM FOR CALCULATING MACHINE
Filed Aug. 11, 1964  6 Sheets-Sheet 3

INVENTOR.
RICHARD E. BUSCH
BY Charles R. Miranda
ATTORNEY

INVENTOR.
RICHARD E. BUSCH
BY Charles R. Miranda

ATTORNEY

United States Patent Office 3,348,768
Patented Oct. 24, 1967

3,348,768
ACCUMULATION SELECTING MECHANISM FOR CALCULATING MACHINE
Richard E. Busch, La Puente, Calif., assignor to Sperry Rand Corporation, New York, N.Y., a corporation of Delaware
Filed Aug. 11, 1964, Ser. No. 388,900
6 Claims. (Cl. 235—60)

The present invention relates in general to calculating machines of the cash registering type and more particularly to a multiple accumulator selecting and tens transfer mechanism for such machines.

The invention is basically designed for a cash register in which, in addition to the main itemizing accumulator, there is provided a plurality of secondary department accumulators. The invention comprises a mechanism by which a particular secondary accumulator may be selected for digitation and directly associated with the secondary accumulators for effecting a tens transfer.

It is an object of the present invention to provide a calculating machine having differential actuators for multiple department accumulators coordinated to the main itemizing accumulator racks in such a way that no transverse spring load is exerted on the main racks in home position and no extra motion of the main racks is needed for transfer of said accumulators.

It is another object of the instant invention to provide a calculating machine provided with a plurality of spring transfer, lateral shift type department accumulators in addition to the normal working accumulator and a tens transfer mechanism and accumulator selecting mechanism therefor.

It is a further object of the instant invention to provide a calculating machine of the type described in which positive false transfer prevention of the transfer racks is provided.

It is still another object of the instant invention to provide a calculating machine of the type described in which one department accumulator in each station may be digitized simultaneously in addition to the working accumulator.

It is a further object of the instant invention to provide a calculating machine of the type described having multiple secondary accumulators which are actuated in a very simple manner requiring only few parts.

It is a still further object of the instant invention to provide a calculating machine of the type described having multiple secondary accumulators and a mechanism which provides for accumulator selection from the keyboard of the machine.

It is another object of the instant invention to provide a calculating machine of the type described having multiple secondary accumulators and a tens transfer mechanism for the secondary accumulators which provides an overall mechanical advantage through the transfer linkage such that the transfer spring in one column can easily unlatch against pressure of a similar spring in the column of the next higher order.

It is still another object of the instant invention to provide a calculating machine of the type described having multiple secondary accumulators and a tens transfer mechanism for the secondary accumulators in which transfer carry is automatically initiated as the transfer racks pass through the last increment of motion on the return stroke.

These and other objects, features and advantages of the present invention will become more obvious from the following description when taken in connection with the accompanying drawings, which show for purposes of illustration only, one embodiment in accordance with the present invention and wherein:

The present invention is particularly designed for use with the accumulator control and positioning mechanism described in copending application Ser. No. 388,901 filed Aug. 11, 1964, in the name of Richard E. Busch; however, it is to be understood that the present invention may be utilized with other arrangements than disclosed in said copending application and may be utilized to equal advantage in other forms of calculating machines.

Figure 1:
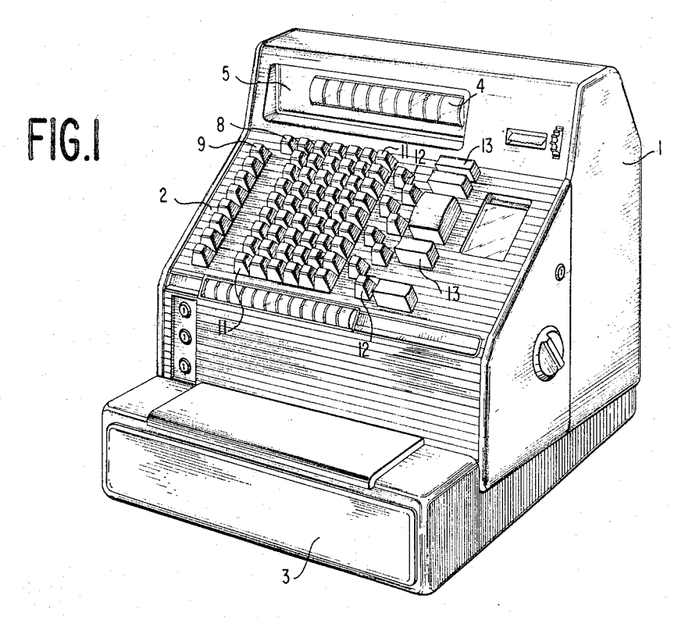
FIGURE 1 is a perspective view of a calculating machine of the type into which the instant invention may be incorporated.

The machine comprises in general, as seen in FIGURE 1, a main cover 1 which includes a keyboard 2 providing the various control keys which effect operation of the machine through desired selected functions. A cash drawer 3 is provided at the lower portion of the machine, and above the keyboard 2 there is provided a dial system 4 visible through window 5, which dial system indicates the amounts involved in each transaction of the machine along with other pertinent information.

The keyboard 2 contains a first column of keys 9 on the left side thereof which provide for general identification of the operator. No accumulator is included in this column, and therefore the reciprocating rank is utilized only to set the dial system 4. The next column is empty except for an amount release key 8, which controls the depressed amount keys so as to provide selective release thereof without initiating a machine cycle.

Amounts are entered into the machine by way of amount keys 11 which are provided in six columns. Two columns are provided adjacent the amount keys 11 for a plurality of department keys 12, which serve to select the department accumulator which are digitized during the cycle and also the type of digitation which is to occur as well as other functions which will be described below.

The right hand column on the keyboard 2 provides the function keys 13, which, for example, may include a change balance due and no sale key, a total key, an add or grocery key, etc. The computing mechanism of the machine is motor driven and includes a cyclically operable main cam shaft 31 (FIGURE 2), driven by a cyclic clutch (not shown) under control of the department keys 12 and the function keys 13, depression of any of which will initiate a cycle of operation of the machine.

Figure 2:
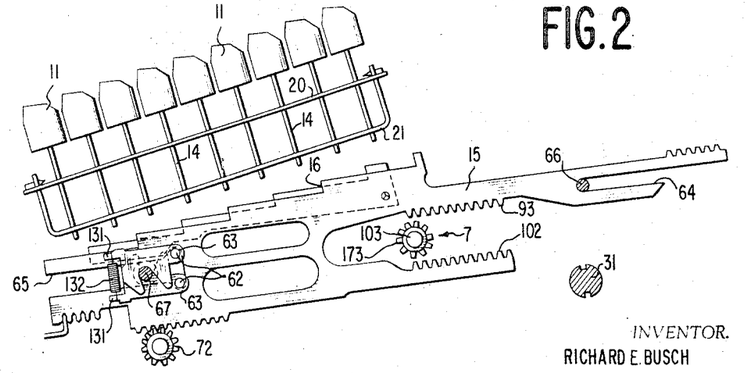
FIGURE 2 is a longitudinal section of the machine illustrating the racks, keyboard and associated elements.

FIGURE 2 shows the general construction of the keyboard which is substantially identical to the basic keyboard mechanism in the well-known "Clary" adding machine. Each of the amount keys 11 of the keyboard includes a key stem 14 guided for vertical movement in aligned slots formed in keyboard frame plates 20 and 21. The lower edges of the key stems cooperate with spaced shoulders 16 formed on aligned racks 15 to limit the forward advancement of each rack to a number of increments corresponding to the numerical value of the key depressed.

Means (not shown) associated with the main cam line are provided for yieldably advancing the racks 15 during the first half of a machine cycle and for returning them to their home positions after a printing operation and during the latter half of the machine cycle. The racks are provided with slots 64 and 65 which are slidably guided over support shafts 66 and 67, respectively. The shaft 67 is slidably mounted in suitable guide slots (not shown) in the frame of the machine.

In order to yieldably advance the various racks, each rack has opposed notches 63 located at the closed end of its slot 65, the notches being normally engaged by rollers 62 carried by pawls 131 pivotally mounted on the shaft 67. A tension spring 132 extends between each pair of pawls whereby to urge the latter outwardly and thus hold the rollers 62 in driving engagement with the notches 63, thereby yieldably advancing any racks which are otherwise free to do so. When any one of the racks 15 is arrested by a depressed amount key stem or by a zero block (not shown), the rollers 62 will ride out of the notch 63 of the blocked rack and along the edges of the slot 65.

The primary accumulator 7 is basically disclosed in the Drake Patent No. 2,472,696. Reference may be made to said patent for a complete disclosure of details of the accumulator not specifically shown herein. In general, the primary accumulator 7 comprises a plurality of accumulator gears 173 independently mounted on an accumlator shaft 103. For the purpose of raising the accumulator 7 from its neutral position, shown in FIGURE 2, into its upper position when the accumulator gears 173 mesh with the upper rack gear sections 93 of the associated racks or lowering the unit wherein the gears 173 mesh with the rack gear sections 102, the present invention provides an accumulator positioning mechanism which will be described in greater detail in conjunction with FIGURE 5.

In addition to the normal working accumulator, the machine in accordance with the invention is also provided with a plurality of additional department accumulators which are arranged in one or more stations (FIGURE 3) depending upon the number of totals which is desired. Each secondary accumulator station is provided with four accumulators. For selection of a particular accumulator, there are provided the columns of department keys 12 in the keyboard (FIGURE 1), there being one column of keys for each station of accumulators. Each column contains four department keys representative of the four accumulator positions at a particular station. The particular manner in which these keys properly select one of the four accumulators provided in each station forms a part of the invention to be described in connection with FIGURES 6 through 10.

Figure 3:
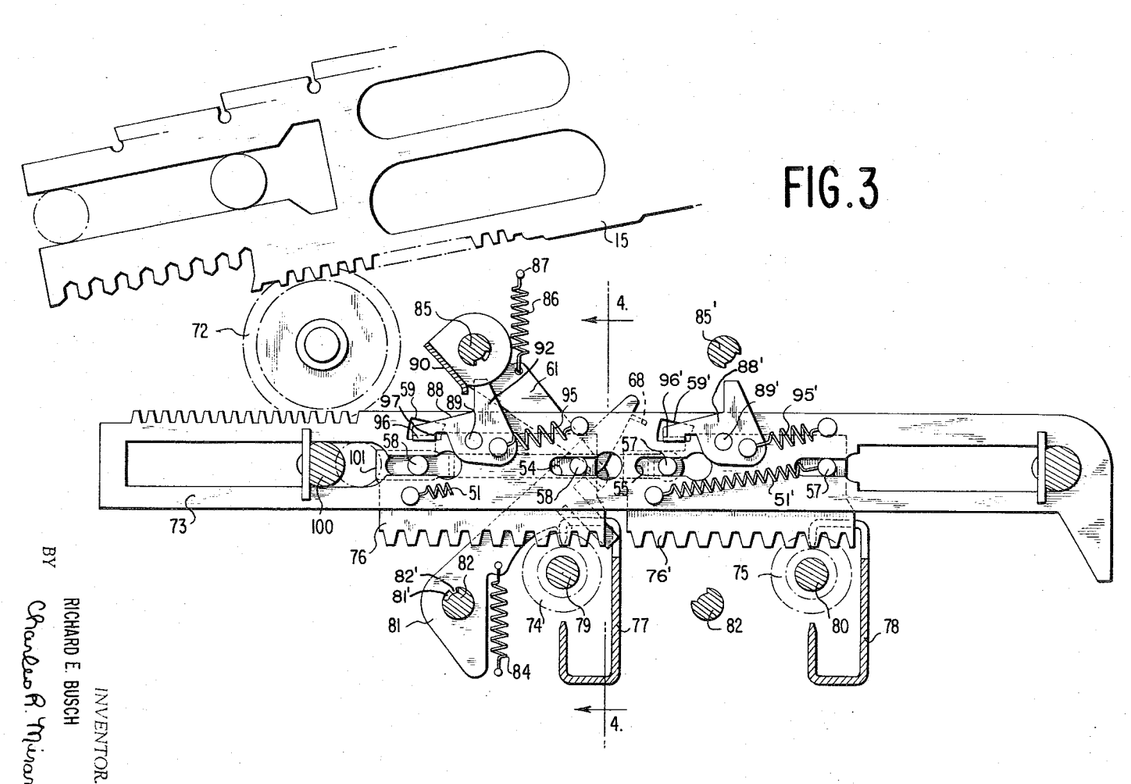
FIGURE 3 is a longitudinal section of the machine illustrating the tens transfer mechanism of the instant invention.

Looking first to the manner in which the lower accumulators are digitized in coordination with the main accumulator rack, FIGURE 3 shows the main accumulator rack 15 in an amount column which on its forward stroke to the left digitizes a working accumulator 7 (FIGURE 2) and also, through an idler gear 72, drives a lower main rack 73 on its initial stroke to the right. The rack 73 has slidably mounted on the other side thereof, as seen in FIGURE 3, transfer racks 76 and 76' which serve to digitize their respective lower accumulators 74 and 75. The racks 76 and 76' are supported by pins 58 and 57 carried by slots 54 and 55, respectively, in rack 73. Springs 51 and 91 mounted between the respective racks 76 and 76' and the rack 73 bias the transfer racks into a reference position. During the forward stroke of the upper rack 15 and corresponding initial stroke of the lower rack 73, the lower accumulators 74 and 75 are retained in the neutral position in engagement with their respective detent bars 77 and 78. In performing an add operation during the latter half cycle of machine operation and before the racks 15 begin their homeward stroke, one of the accumulator shafts 79 or 80 associated respectively with a lower accumulator 74 or 75, depending upon station selection from the keyboard, will raise the associated accumulator gear from its detent bar and into mesh with its associated transfer rack 76 or 76'.

As the rack 15 begins its homeward stroke, the lower transfer rack 76 will digitize its respective accumulator gear. It should be noted that the lower accumulators are digitized on the backstroke of the upper main rack and therefore the additional accumulator loads do not hinder the digitation of the upper rack. In addition no transfer spring load is applied to the main rack in the home position and no extra motion of the main racks is needed for tens transfer.

Figure 4:
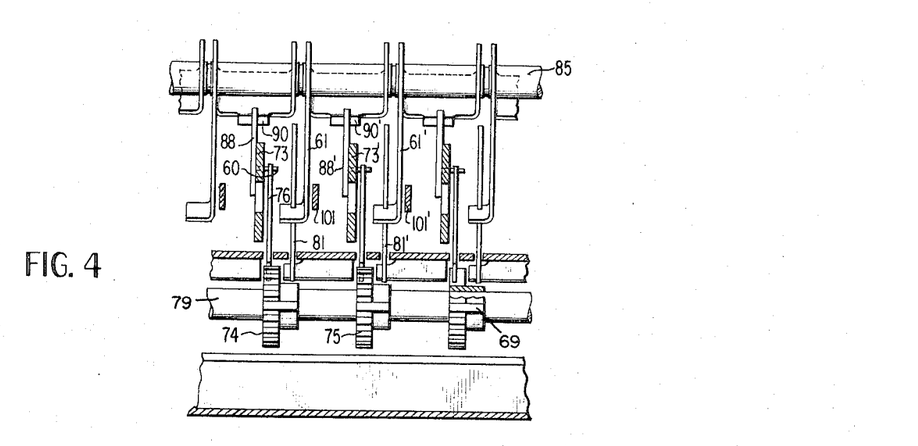
FIGURE 4 is a section view taken along line 4—4 of FIGURE 3 illustrating successive transfer racks and the tens transfer mechanism of the invention.
Figures 5, 6:
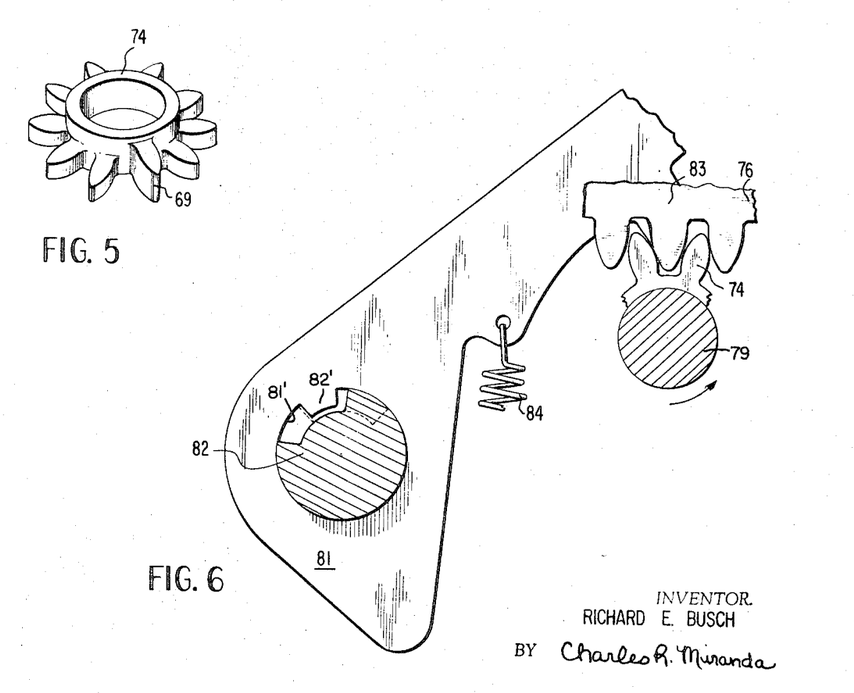
FIGURE 5 is a perspective view of an accumulator element in accordance with the invention.
FIGURE 6 is a detail view of the lever mechanism which initiates tens transfer in the device of FIGURE 3.

During the digitizing stroke of the rack 76 and 76' should a tens transfer become necessary, a double width tooth 69 is provided on the accumulator gears 74 and 75 which are alike, as illustrated in FIGURE 5. A pivot arm 81 is rockably mounted upon shaft 82 in proximity to each of the accumulator gears and contains a camming tooth 83 (FIGURE 6) which is positioned in the same plane as the double width tooth 69 of the accumulator gear and is biased by spring 84 in contact with the accumulator gear so that during counterclockwise rotation when the double width tooth strikes the camming tooth 83 on pivot arm 81, the pivot arm will rock counterclockwise about the shaft 82. As seen in FIGURES 3, 4 and 6, the pivot arm 81 normally latches a transfer latch 61 of the next higher order, which is pivotally mounted upon shaft 85. When the transfer latch 61 is released by pivot arm 81, it will pivot in a counterclockwise direction about the shaft 85 in response to the bias provided by spring 86, which extends between transfer latch 61 and a framing pin 87. The transfer latch 61 will rotate in a counterclockwise direction to a position determined by the stop 68, and this will be effective to produce a tens transfer in the rack 76' associated with the lower rack 73 and the accumulator 75 of the next higher order, as will now be described.

Looking to both FIGURES 3 and 4, a lever 88 is loosely pinned to the lower rack 73 at 89 and is biased in a counterclockwise direction by spring 95 so that a latching lip 96 extending through an aperture 59 in rack 73 forms a reference stop for the transfer rack 76. In a similar manner the lever 88' loosely pinned to the lower rack 76' at 89' is biased in a counterclockwise direction by the spring 95' so that a latching lip 96' extending through aperture 59' in rack 73 forms a reference stop for the transfer rack 76'.

When the pivot arm is indexed by the tooth 69 on accumulator gear 74 and the transfer latch 61 is released, the latch 61 will move to a position against stop 68 such that a projection 90 on the transfer latch 61 will move to a point where it will contact upper arm 92 of lever 88 on return movement of the rack 73.

The clockwise rotation of lever 88 against the bias of spring 95 lifts the latching lip 96 on lever 88 from the path of the shoulder 97 of transfer rack 76 allowing the transfer rack 76 to move under the action of spring 51 one increment to the left determined by stop 58 mounted on the transfer rack 76. Movement of the transfer rack 76 one increment to the left advances the accumulator gear in engagement with the transfer rack by one tooth.

Relatching of the transfer mechanism occurs during the first part of the following cycle during the time used to mesh the working accumulator. It is effected by movement of a rack support shaft 100 connected to the working accumulator positioning mechanism (FIGURE 3). Movement of the rack support shaft 100 to the right, as seen in FIGURE 3, will drive a bar 101 mounted on the rack 76 to the right so that the lever 88 under the influence of its spring 95 will snap down over the shoulder 97 relatching the rack 76. At the same time, the shaft 85 will rotate clockwise as the lever 88 contacts the projection 90 of the transfer latch or bail 61 so its operating arm will be rotated in a clockwise direction downwardly to be relatched by the pivot arm 81.

It should be apparent from the above description that the transfer mechanism associated with the transfer rack 76' has the same parts (similarly numbered but primed) and operates identically but independently from rack 76 to control the four accumulators 75 associated therewith. It is also pointed out that the transfer racks and mechanisms associated with each of the accumulators on the shafts 79 and 80 are interlinked by the transfer latches, such as latch 61, so that tens transfer is accomplished without placing an additional load on the main accumulator rack 15.

During a sub-total or a total operation, the shaft 82 which carries pivot arm 81 will rotate clockwise bringing the edge of its slot 81' next to the key 82' of the pivot arm 81 preventing said arm from rotating, thereby acting as a zero stop during these aforementioned operations during which tens transfer is not desired. It is pointed out at this time that clockwise rotation of the lower accumulators during the first portion of the cycle produces a total operation whereas counterclockwise rotation of the accumulators during the return portion of the cycle produces an add operation. The lower accumulators will produce a total, a subtotal or an add operation, but do not produce a subtraction operation.

Figure 7:
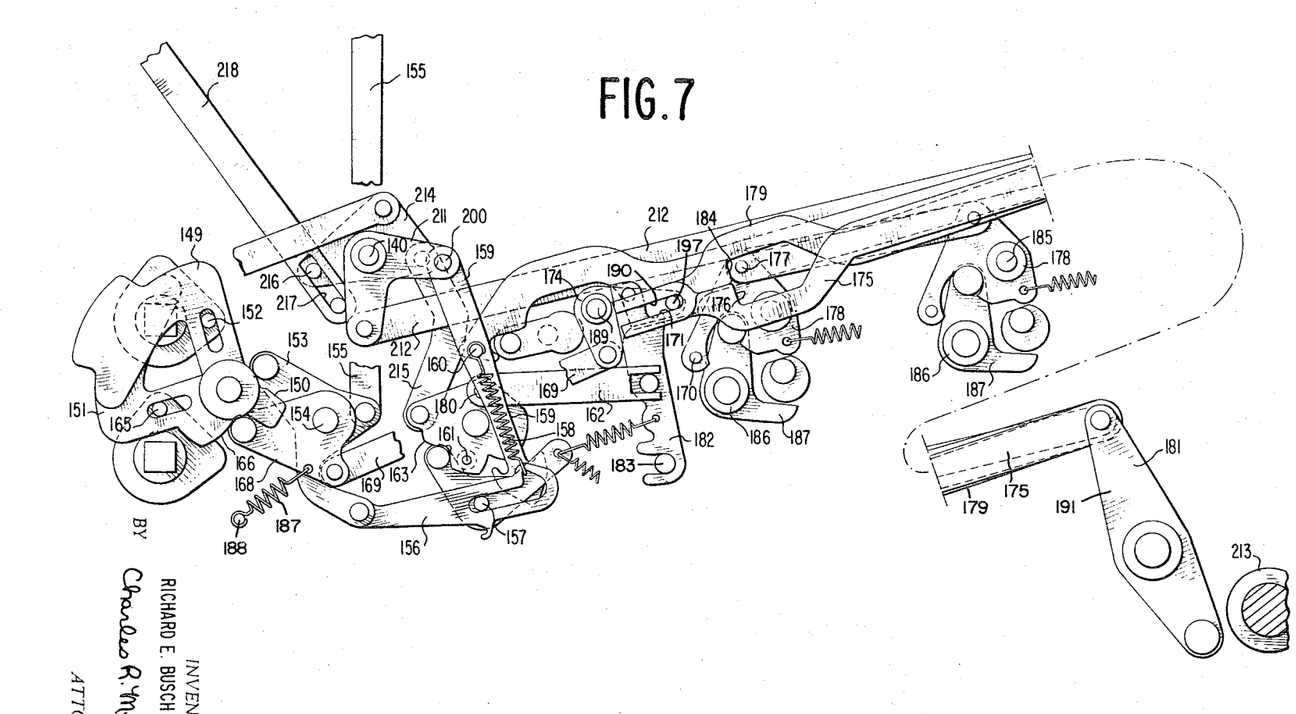
FIGURE 7 is an illustration of the secondary accumulator positioning mechanism.
Figure 8:
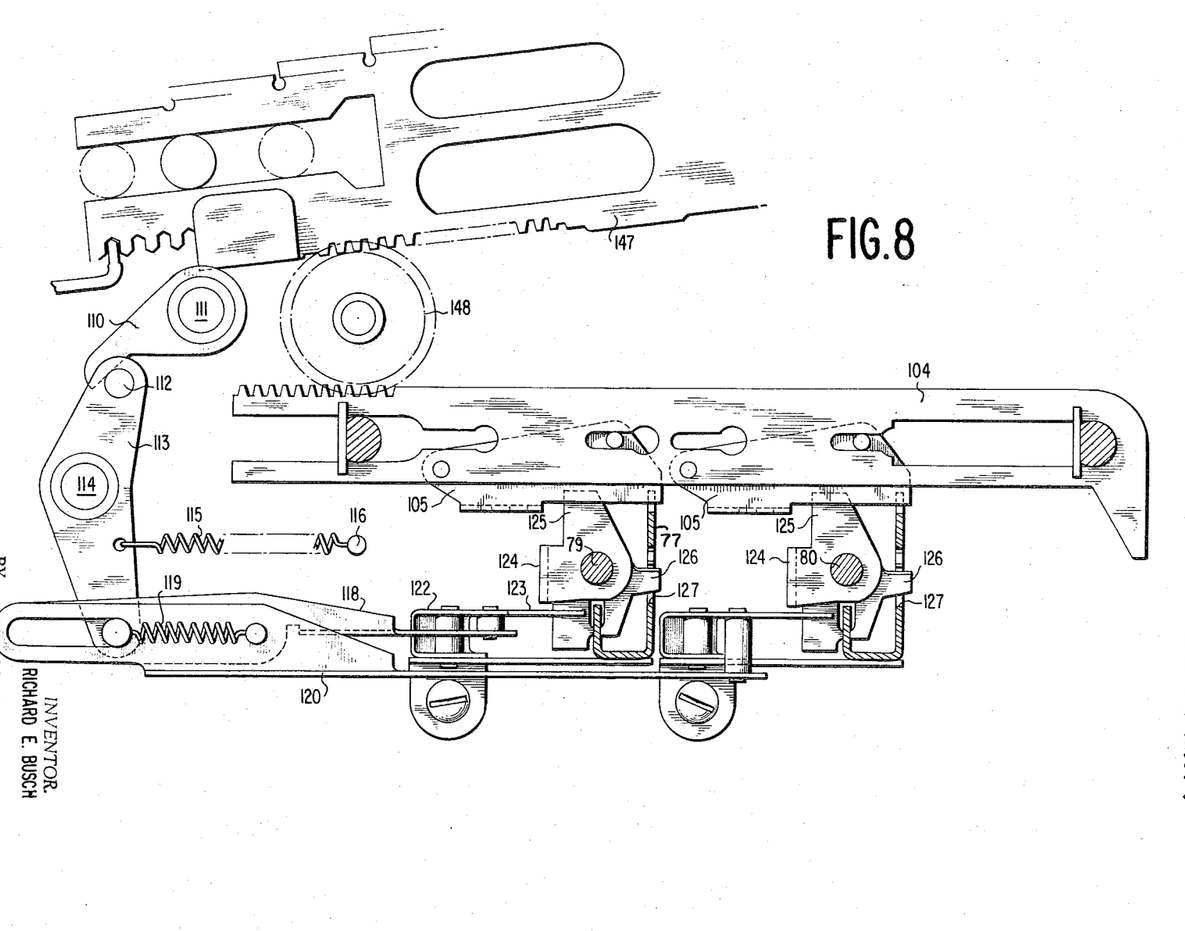
FIGURE 8 is a longitudinal section of the machine illustrating the accumulator selection mechanism of the instant invention.
Figure 9:
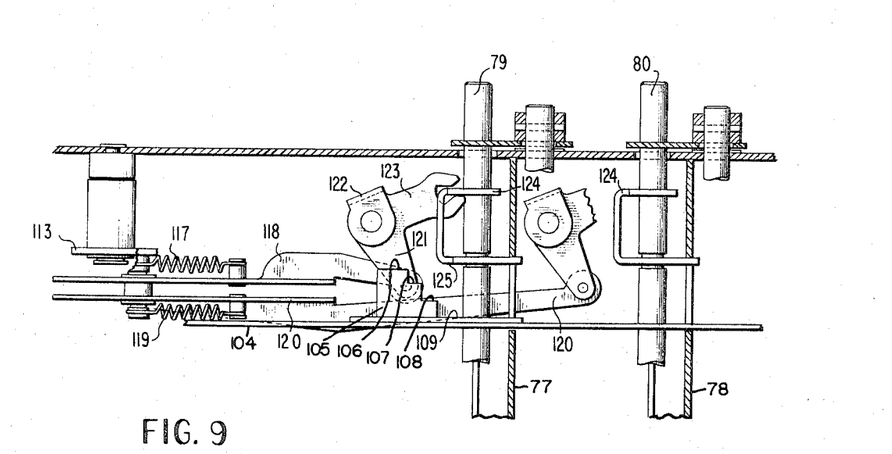
FIGURE 9 is a bottom view of the mechanism of FIGURE 8 illustrating the manner in which the accumulator shaft is arrested in proper position.
Figure 10:
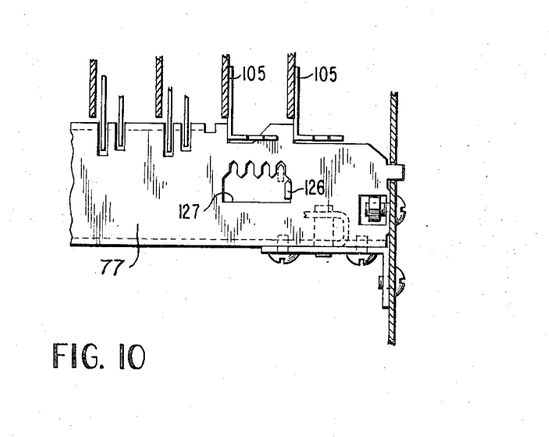
FIGURE 10 is a detail view of a portion of the mechanism of FIGURE 8 illustrating the manner in which the selector mechanism is locked during the second half of the machine cycle.

The mechanism for positioning the lower accumulators 74 and 75 is illustrated in FIGURE 7. Cams 149 and 151 operate through selector locks (not shown) to condition the machine for a read or reset operation. The cam 149, representing a read operation, is rotated in a counterclockwise direction by means of a pin 152 connected to the lock assembly. A cam surface 150 on the cam 149 will rotate a cam follower 153 clockwise about its pivot shaft 154. The follower 153 has pinned thereto a link 155 connected to a bell crank operable to cause shifting of a bail associated with the keyboard control slides as disclosed in aforenoted Ser. No. 388,901. The bail in turn will move interlock slides in the keyboard into a position where none of the keys in the amount section can be depressed; while in the department section, depression of department keys is permitted if neither the subtotal or total keys in the function section have been depressed. In the function section, a slide will be moved so that only the subtotal or total key can be depressed, and this will be possible only if none of the keys in the department section have been depressed.

The follower 153 has connected thereto a second link 156 which, when the follower is rotated, rides to the left over a guide pin 157. A spring 158 is connected between the link 156 and a pin 160 on a sword fish 159. When the link 156 is moved to the left through rotation of the cam follower 153, the spring 158 will rock the sword fish 159 to the left until it is in alignment beneath a pin 161 mounted on a rotatable disk 163.

It should be noted that the machine requires two cycles to reset or read a department total. The first cycle is for positioning the desired accumulator beneath the racks and the second cycle is for the actual read or reset operation.

The extreme end of the sword fish 159 opposite the pin 161 is connected at 200 to a pivot arm 211 rotatable about stationary shaft 140. The pivot arm 211 is rocked through link 212 by the main cam line 213 via a cam follower 181.

The cam 149 having been set, counterclockwise rocking of the pivot arm 211 by the main cam line 213 actuates the sword fish 159 during return so as to effect clockwise rotation of the rotatable disk 163 through contact with the pin 161. A link 162, pinned to the disk 163 at 180, will thus rock a latch arm 182 about pivot pin 183 into the path of a latch pin 170 mounted on an accumulator engaging cam 178.

A selector link 179, connected at one end to the cam follower 181, has a latching surface 184 which lies in the same plane as a pin 177 which is also mounted on the accumulator engaging cam 178, and is rotatable with cam 178 about pivot shaft 185. When main cam line 213 rocks the cam follower 181, the surface 184 will strike the pin 177 rocking the cam 178 clockwise thereby rotating bell crank 187 about pivot axis 186 in a counterclockwise direction to mesh the accumulator 74 with the racks and at the same time latch the pin 170 on a surface 171 of the latch arm 182 which will hold the accumulator in mesh during the last half of the first cycle and the first half of the second cycle.

The latch arm 182 will, in the first half of the second cycle, be released by the machine mechanism so that later in the cycle when the selector link 179 is rocked back to its home position, the engaging cam 178 will be allowed to rotate back to its rest position, de-meshing the accumulator from the racks.

The cam 151, which conditions the machine for a reset operation via a selector lock (not shown), is rotated in a counterclockwise direction through a pin 165 mounted on the selector lock actuating mechanism. A cam surface 166 of the cam 151 will rotate the cam follower 153 to perform the same functions described above in connection with the cam 149 with the exception that a selector link 175 connected to a cam follower 191, like 181, which engages a separate cam on the main cam line 213 will be moved into the plane of the pin 177 so that the accumulator 74 will be de-meshed from the racks a half cycle earlier for the reset operation than for the read operation.

The means for changing the positions of the selector links comprises a cam follower 168 which is urged against the camming surface 166 of cam 151 by a spring 187 connected to frame pin 188. A link 169, connected between the follower 168 and a pivot arm 174, will pivot the arm 174 about pivot shaft 189 in a counterclockwise direction so that the pin 197, which passes through slots 190 and 191 in the end of the link 175 and 179, respectively, will lift the links upward, placing the latching surface 176 of the link 175 in the same plane as the pin 177. When the cam follower 191 like and directly behind cam follower 181 is rocked by the main cam 213 the link 175 will be actuated so that the latching surface 176 will strike the pin 177 rotating the accumulator engaging the cam 178 in a clockwise direction and the bell crank 187 in a counterclockwise direction thereby engaging the accumulator with the rack; however, the accumulator will be de-meshed from the racks a half cycle earlier because the link 175 is controlled by a different cam on the line 213.

A second pivot arm 214 is also mounted on the bell crank shaft 140 and is connected at one end to the rockable disk 163 through a link 215. The other end of the pivot arm 214 carries a stud 216 which rides in a slot 217 of a link 218. The link 218 is connected at its opposite end to a zero bail in the keyboard control slide section (not shown). The control of the zero bail during a read and reset operation comes about because the department accumulators are engaged later in the cycle while the racks will tend to move early in the cycle with the itemizing accumulator 7 in mesh. In a normal cycle the zero stops are released through a link in the main accumulator section (not shown) but during a read or reset cycle, the link 218 will not allow them to release until the department accumulators 74 and 75 are also meshed.

In order to acquire as many accumulators as possible, there are provided four accumulators at each station, they all being mounted on the shaft 79 or 80 or additional shafts if more than two stations are provided. Each of the accumulator shafts is slidably mounted in the machine side frames in any known manner. As previously stated, selection of a particular accumulator is accomplished by means of keys provided on the keyboard of the machine, there being one column of keys for each station of accumulators. Each column contains four keys representative of the four accumulator positions at that particular station.

Provided for each column of department selection keys is a main rack 147 (FIGURE 8), an idler gear 148 and a lower accumulator selection rack 104, which is somewhat similar to rack 73 in FIGURE 3, except that, instead of carrying slidable transfer racks 76, these lower racks carry step plates 105 having four steps 106 through 109 (FIGURE 9) representative of the four positions of the accumulator shafts 79 and 80 which will place each of the four accumulators at each station in an engaging position with the lower transfer rack 76.

At the beginning of a cycle, rack 147 through idler gear 148 will drive the rack 104 to a position determined by a depressed selection key 12 in the keyboard, thereby placing a step on the rack 147, representative of the depressed selection key, in an appropriate position. At the same time, an arm 110 is rotated counterclockwise on shaft 111 by the upper rack 147. Following the arresting of the racks 147 and 104, the arm 110 will strike a pin 112 carried on a bell crank 113, which is pivoted at 114. As the bell crank 113 is rocked clockwise about its pivot 114 against the bias of spring 115, connected to frame pin 116, it will through a spring 117 (FIGURE 9) connected to its free end pull a link 118 to the left. Also connected to the bell crank 113 at its free end is a second link 120 and spring 119, the link 118 serving to actuate the accumulator positioning mechanism to station 1 and the link 120 serving to actuate the accumulator positioning mechanism for station 2. Since the accumulator positioning mechanism for the stations 1 and 2 are identical and are actuated in an identical manner by the links 118 and 120, only one combination will be described in detail, it being understood that this description applies also to the structure and operation of the positioning mechanism for station 2.

The link 118 is pinned to the crank arm 121 of a bail 122 and serves to rotate the bail in a clockwise direction. An arm 123 of the bail will through a U-shaped positioning bar 124 which is securely mounted in a groove on the accumulator shaft 79, shift the accumulator shaft until an edge 125 of the positioning bar 124 strikes a respective step 106 through 109 of the step plate 105, thereby positioning the respective accumulator gear beneath a respective transfer rack. The particular position of the step plate 105 which effects proper registration of the edge 125 with the correct step on the plate has already been determined by the proper positioning of the lower rack 104 through coordinated movement of the upper rack 147 to the position determined by the selection key 12 which has been depressed.

During the latter half of the machine cycle, the accumulator shaft 79 will be raised to mesh the respective set of accumulator gears 74 with the transfer rack 76. At the same time a tail 126 of the positioning bar 124 will enter a respective detent in the accumulator gear detent bar 77 (FIGURE 10) so that as the racks return home thereby rotating the arm 110 clockwise, the tail 126 positioned in the detent 127 will prevent the accumulator shaft 79 from moving to its home position. However, when the accumulator shaft is lowered by the accumulator positioning mechanism near the end of the cycle, the tail will be lowered out of the detent 127 allowing the accumulator to return home under the action of the spring 117.

As is apparent from the above description, and while the description related to a provision of only two stations of accumulator gears, it should now be obvious that several stations each having four accumulator gears may be provided by merely increasing the length of the lower rack.

The tens transfer mechanism and the accumulator selection device of the instant invention provide many unique advantages, the majority of which result from the rather simple manner in which the ends of the invention are accomplished. The tens transfer mechanism provides for simple, lateral shift of the lower racks especially due to the fact that the lateral shift occurs with the accumulator gears out of mesh with the racks and the transfer mechanism such that only a smooth liner bar engages the gears in this position. No accumulator gear detents are provided to add loads to the rack drive. This is all accomplished with a minimum number of parts providing for dependability and low cost of manufacture. In addition, in overall mechanical advantages provided in the transfer linkage such that the transfer spring in one column can easily unlatch against pressure of a similar spring in the column of next higher order. The transfer carry is automatically initiated as the racks pass through the last increment of motion on the return stroke and the transfer mechanism is restored during the time used to mesh the working accumulator, except on totals and subtotals when the transfer restore function is disabled and one of the multiple accumulators is engaged.

I claim:

1. In a calculating machine of the cash registering type having a plurality of differential actuators, a plurality of accumulator elements driven by said differential actuators, an extent representative of a numerical value, and means for driving said differential actuators through incremental amounts relating to said numerical values, the improvement essentially consisting of at least two accumulator elements associated with each differential actuator capable of being selectively positioned in operative association therewith, an accumulator selection rack reciprocable between a reference position and a plurality of positions representative of accumulator selection, means for selectively driving said rack to a representative position, positioning means for shifting said accumulator elements in relation to their associated differential actuators, step means associated with said accumulator selection rack for arresting said positioning means in a position determined by the representative position of said selection rack so as to place one of said accumulator elements in operative association with its respective differential actuator.

2. In a calculating machine of the cash registering type having a plurality of differential actuators, a plurality of accumulator elements driven by said differential actuators, an extent representative of a numerical value, and means for driving said differential actuators through incremental amounts relating to said numerical values, the improvement essentially consisting of at least two accumulator elements associated with each differential actuator capable of being selectively positioned in operative association therewith, an accumulator selection rack reciprocable between a reference position and a plurality of positions representative of accumulator selection, means for selectively driving said rack to a pre-selected representative position, positioning means for shifting said accumulator elements transversely in relation to their associated differential actuators in response to movement of said accumulator selection rack to a representative position, step means associated with said accumulator selection rack for arresting said positioning means in a position determined by the representative position of said selection rack so as to place one of said accumulator elements in operative association with its respective differential actuator, and means for locking said positioning means in said representative position during return movement of said selection rack to its reference position while said accumulator elements are being digitized.

3. In a calculating machine of the cash registering type having a plurality of differential actuators, a plurality of accumulator elements driven by said differential actuators, an extent representative of a numerical value, and means for driving said differential actuators through incremental amounts relating to said numerical values, the improvement essentially consisting of a plurality of accumulator elements mounted on a reciprocable shaft associated with each differential actuator and capable of being selectively positioned in operative association therewith, an accumulator selection rack reciprocable between a reference position and a plurality of positions representative of accumulator selection, means for selectively driving said rack to a pre-selected representative position, positioning means for slidably shifting said reciprocable shaft in relation to said differential actuators so as to selectively position one accumulator element in operative association with each differential actuator in response to movement of said accumulator selection rack to a representative position, step means having an abutment surface for each accumulator position positioned by said accumulator selection rack for arresting said positioning means in a position determined by the representative position of said selection rack so as to place one of said accumulator elements in operative association with each respective differential actuator, and means for locking said positioning means in said representative position during return movement of said selection rack to its reference position while said accumulator elements are being digitized.

4. In a calculating machine of the cash registering type having a plurality of primary differential actuators, a plurality of accumulator elements respectively driven by said primary differential actuators an extent representative of a numerical value, and means for driving said differential actuators, the improvement essentially consisting of a plurality of secondary differential actuators operably associated with respective ones of said primary differential actuators for coordinate movement therewith, a plurality of secondary accumulator elements associated with each secondary differential actuator and capable of being selectively positioned in operative association therewith, at least one accumulator selection rack reciprocable between a reference position and a plurality of positions representative of accumulator selection, means for selectively driving said rack to a representative position, positioning means for shifting said secondary accumulator elements transversely to said respective differential actuators, step means having an abutment surface for each accumulator position mounted on said accumulator selection rack for arresting said positioning means in a position determined by the representative position of said selection rack so as to place one of said accumulator elements in operative association with its respective differential actuator.

5. In a calculating machine of the cash registering type having a plurality of primary differential actuators, a plurality of accumulator elements respectively driven by said primary differential actuators an extent representative of a numerical value, and means for driving said differential actuators, the improvement essentially consisting of a plurality of secondary differential actuators operably associated with respective ones of said primary differential actuators for coordinate movement therewith, a plurality of secondary accumulator elements associated with each secondary differential actuator and capable of being selectively positioned in operative association therewith, at least one accumulator selection rack reciprocable between a reference position and a plurality of positions representative of accumulator selection, means for selectively driving said rack to a pre-selected representative position, positioning means for shifting said secondary accumulator elements transversely to their respective differential actuators in response to movement of said accumulator selection rack to a representative position, step means having an abutment surface for each accumulator position mounted on said accumulator selection rack for arresting said positioning means in a position determined by the representative position of said selection rack so as to place one of said accumulator elements in operative association with its respective differential actuator, and means for locking said positioning means in said representative position during return movement of said selection rack to its reference position while said secondary accumulator elements are being digitized.

6. In a calculating machine of the cash registering type having a plurality of primary differential actuators, a plurality of accumulator elements respectively driven by said primary differential actuators an extent representative of a numerical value, and means for driving said differential actuators, the improvement essentially consisting of a plurality of secondary differential actuators operably associated with respective ones of said primary differential actuators for coordinate movement therewith, a plurality of secondary accumulator elements mounted on a reciprocable shaft associated with each secondary differential actuator and capable of being selectively positioned in operative association therewith, at least one accumulator selection rack reciprocable between a reference position and a plurality of positions representative of accumulator selection, means for selectively driving said rack to a pre-selected representative position, positioning means for shifting said reciprocable shaft transversely to said respective differential actuators so as to selectively position one accumulator element in operative association with each secondary differential actuator in response to movement of said accumulator selection rack to a representative position, step means having an abutment surface for each accumulator position, said step means being mounted on said accumulator selection rack for arresting said positioning means in a position determined by the representative position of said selection rack so as to place one of said accumulator elements in operative association with its respective differential actuator, and means for locking said positioning means in said representative position during return movement of said selection rack to its reference position while said secondary accumulator elements are being digitized.

References Cited
UNITED STATES PATENTS

| | | | |
|---|---|---|---|
| 2,620,129 | 12/1952 | Kirstenson et al. | 235—60 |
| 2,647,687 | 8/1953 | Parsons et al. | 235—60 |
| 2,696,944 | 12/1954 | Goodbar et al. | 235—60 |
| 2,741,426 | 4/1956 | Golemon | 235—6 |
| 2,755,993 | 7/1956 | Christian et al. | 235—60.48 |
| 2,858,074 | 10/1958 | Reeves | 235—133 |
| 3,022,947 | 2/1962 | Viola et al. | 235—133 |
| 3,070,294 | 12/1962 | Lapointe | 235—60 |

STEPHEN J. TOMSKY, *Primary Examiner.*